United States Patent [19]
Ogawa et al.

[11] Patent Number: 6,088,076
[45] Date of Patent: Jul. 11, 2000

[54] LIQUID CRYSTAL DISPLAY APPARATUS USING HOLOGRAPHIC OPTICAL ELEMENT

[75] Inventors: Masahiro Ogawa, Ome; Yukio Suzuki, Hamura, both of Japan

[73] Assignee: Casio Computer Co., Ltd., Tokyo, Japan

[21] Appl. No.: 08/792,436

[22] Filed: Jan. 30, 1997

[30] Foreign Application Priority Data

| Feb. 2, 1996 | [JP] | Japan | 8-039142 |
| Feb. 22, 1996 | [JP] | Japan | 8-058263 |
| Mar. 15, 1996 | [JP] | Japan | 8-086055 |

[51] Int. Cl.[7] .................. G02F 1/1343; G02F 1/347; G02F 1/1333; G02F 1/1335
[52] U.S. Cl. .................. 349/106; 349/42; 349/110; 349/80; 359/15; 359/22
[58] Field of Search ............... 349/110, 80, 106, 349/42; 359/15, 22

[56] References Cited

U.S. PATENT DOCUMENTS

| 5,267,060 | 11/1993 | Colton | 359/15 |
| 5,506,701 | 4/1996 | Ichkawa | 359/15 |
| 5,526,145 | 6/1996 | Weber | 359/15 |
| 5,566,007 | 10/1996 | Ikeda et al. | 359/40 |
| 5,737,040 | 4/1998 | Ichikawa et al. | 349/9 |

*Primary Examiner*—William L Sikes
*Assistant Examiner*—Julie Ngo
*Attorney, Agent, or Firm*—Frishauf, Holtz, Goodman, Langer & Chick, P.C.

[57] ABSTRACT

A liquid crystal display apparatus uses a holographic optical element to split the light from a light source for generating white light to R, G and B wavelength light components. The split light components enter respective pixels of a liquid crystal cell according to the R, G and B wavelengths, thereby ensuring the display of a color image. In this liquid crystal display apparatus, unit holographic optical elements corresponding to unit pixels each consisting of R, G and B pixels are comprised of holographic optical cells for condensing respective lights of specific wavelengths on the associated pixels. Alternatively, the unit pixels are formed to have symmetrical shapes. Color filters may be provided at some of the pixels of the liquid crystal cell. Accordingly, the light incident to the pixels of the liquid crystal cell is optimized.

9 Claims, 6 Drawing Sheets

LIGHT SPLITTING DIERCTIONS

LIGHT SPLITTING SIRECTIONS

LIQUID CRYSTAL DISPLAY APPARATUS USING HOLOGRAPHIC OPTICAL ELEMENT

BACKGROUND OF THE INVENTION

1. Field of the Invention

The present invention relates to a liquid crystal display apparatus using a holographic optical element.

2. Description of the Related Art

There is a known color liquid crystal display (LCD) apparatus which irradiates light from a light source arranged in the back of a liquid crystal display (LCD) panel (LCD device). This LCD apparatus generally uses red (R), green (G) and blue (B) color filters corresponding to the pixels of the LCD panel. The light from the light source is colored at the time the light from the light source passes through the LCD panel. Using this phenomena, the LCD apparatus displays a color image. When the light from the light source passes through the LCD panel in this LCD apparatus, however, the color filters absorb lights of complementary color components. The LCD apparatus therefore has a poor efficiency of using light from the light source and suffers from too dark a display.

To overcome this problem, an LCD apparatus has been proposed which uses a holographic optical element to diffract the R, G and B wavelength light components of the light from the light source at different diffraction angles so that those wavelength light components are condensed on the respective pixels of the LCD panel corresponding to the R, G and B colors to thereby display a color image. In this LCD apparatus, the light source has a lamp located at the focus point of a reflector which has a parabolic surface. The reflector reflects the white light emitted from the lamp to become parallel light. The LCD panel comprises a liquid crystal (LC) cell, which has a liquid crystal sealed between a pair of transparent electrode substrates, an incident-side polarization plate, arranged in the side where the light from this LC cell enters, and an outgoing-side polarization plate arranged in the side from which the light from the LC cell goes out. The LC cell has pixels corresponding to R, G and B formed in a dot matrix form between the pair of transparent substrates, and a black matrix formed between the pixels.

The holographic optical element used in this LCD apparatus diffracts light of any wavelength with a single diffraction grating at a predetermined diffraction angle which varies in accordance with the wavelength. The holographic optical element is arranged in such a manner that the parallel light from the light source enters at a predetermined angle (e.g., about 60°). The R, G and B wavelength light components of the light incident to the holographic optical element are diffracted at their respective diffraction angles which differ from one another, and are emitted toward the associated pixels of the LC cell. This LCD apparatus can therefore display color images without using color filters.

Because the condensation positions of the R, G and B wavelength light components, split by the holographic optical element, vary wavelength by wavelength, however, the R, G and B wavelength light components actually do not hit the associated pixels of the LC cell evenly.

This will be discussed more specifically. The incident angles of the R, G and B wavelength light components to the associated pixels of the LC cell differ from one another. The shape of the openings of the LC cell is not symmetrical with respect to each unit pixel consisting of three pixels of R, G and B due to the presence of the black matrix which covers TFTs (Thin Film Transistors). Strictly speaking, the light from the light source does not become parallel light. Because of those factors, the light of a certain wavelength may enter other pixels than its associated, predetermined pixel of the LC cell and the intensity of the light which hits each pixel of the LC cell significantly varies from one of the R, G and B wavelength light components to another.

The LCD apparatus therefore suffers a variation in the light intensities of the R, G and B wavelength light components which are to be displayed, disabling the accurate regeneration of white and reducing the display quality of color images.

SUMMARY OF THE INVENTION

Accordingly, it is an object of the present invention to provide an LCD apparatus, which displays images using a diffraction grating such as a holographic optical element and which can avoid a variation in the light intensities of the R, G and B wavelength light components to be incident to or to be displayed, which prevents color intensification and which accurately regenerates white, thus ensuring the display of good-quality color images with an excellent color balance.

According to a preferable mode of this invention, a color LCD apparatus comprises:

a light source for generating light including a plurality of color lights of different wavelengths;

a holographic optical element for splitting the light generated by the light source to a plurality of color lights of different wavelengths to be emitted; and a liquid crystal display device having a plurality of pixels to which any one of the plurality of color lights split by the holographic optical element is to be incident, the holographic optical element having unit holographic optical elements cyclically arranged, each consisting a set of three kinds of holographic optical cells for mainly emitting any one of a red wavelength light, a green wavelength light and a blue wavelength light toward associated pixels of the liquid crystal display device.

According to another preferable mode of this invention, a color liquid crystal display apparatus comprises:

a light source for generating light including a plurality of color lights of different wavelengths;

an optical element using a diffraction grating for splitting the light generated by the light source to a plurality of color lights of different wavelengths to be emitted; and a liquid crystal display device having a plurality of pixels to which any one of the plurality of color lights split by the optical element is to be incident, the optical element having unit optical elements cyclically arranged, each consisting a set of plural kinds of optical cells for mainly splitting one of color lights of a plurality of specific wavelengths and emitting the split color lights to any of the plural kinds of pixels of the liquid crystal display device.

According to a further preferable mode of this invention, a color liquid crystal display apparatus comprising:

a light source for generating light including red, green and blue color lights;

an optical element using a diffraction grating for splitting the light generated by the light source to red, green and blue color lights to be emitted; and a liquid crystal display device having unit pixels cyclically arranged, each consisting of a set of three pixels to which any one of the red, green, blue color lights split by the optical element is to be incident, and a black matrix provided with openings corresponding to the three pixels, the three openings being formed to have symmetrical shapes with respect to that opening of a center pixel.

According to a still further preferable mode of this invention, a color liquid crystal display apparatus comprising:

a light source for generating light including red, green and blue color lights;

an optical element using a diffraction grating for splitting the light generated by the light source to red, green and blue color lights to be emitted;

a liquid crystal display device having three kinds of pixels cyclically arranged, to which any one of the red, green and blue color lights split by the optical element is to be incident; and color filters formed at one or two of the three kinds of pixels of the liquid crystal display device and having same colors as the one or two of the three kinds of pixels.

DETAILED DESCRIPTION OF THE PREFERRED EMBODIMENTS

First Embodiment

An LCD apparatus according to the first embodiment of the present invention will now be described with reference to FIGS. 1 through 4.

Figure 1:
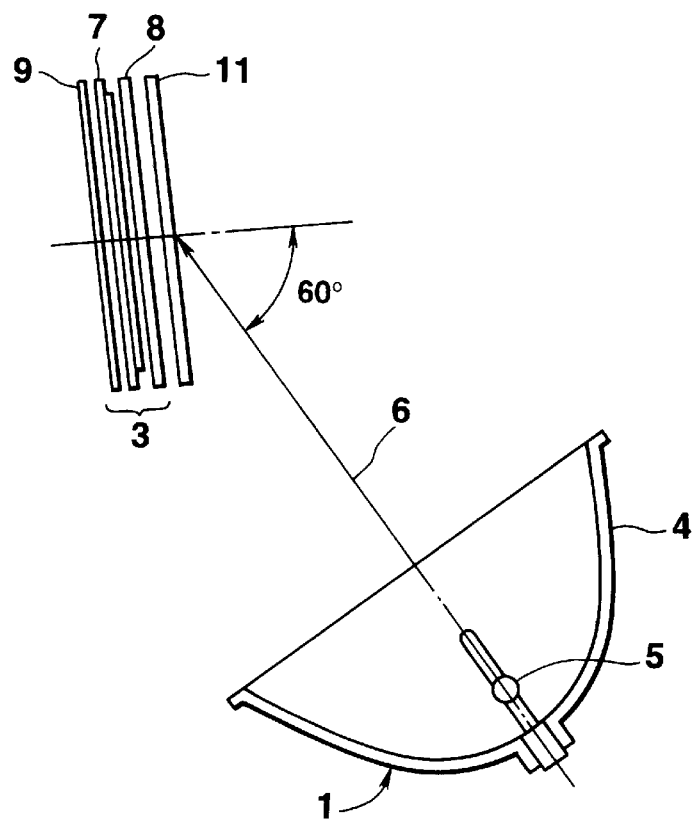
FIG. 1 is a diagram illustrating the general structure of an LCD apparatus according to this invention.
Figure 2:
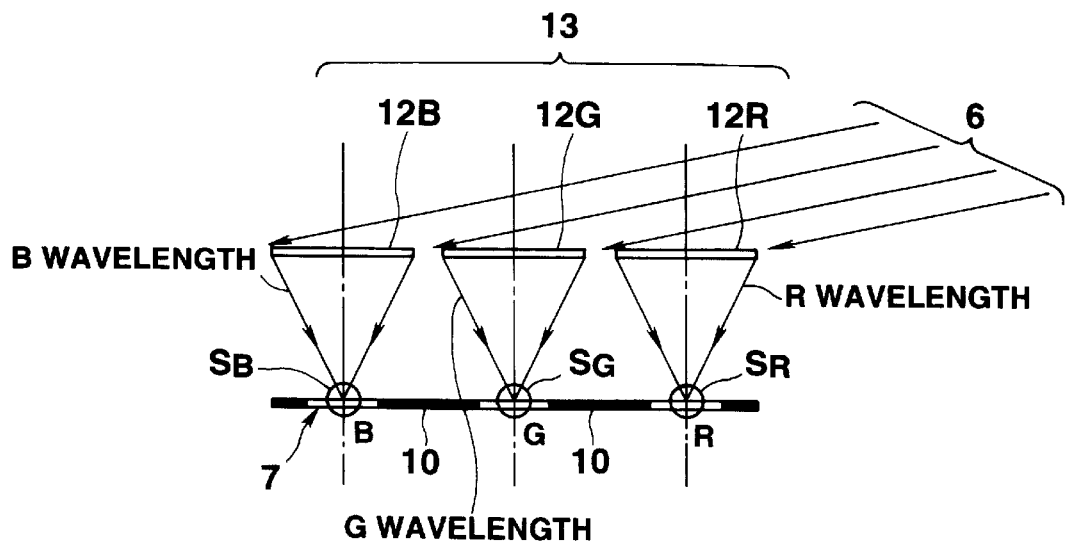
FIG. 2 is a diagram showing lights of specific wavelengths R, G and B diffracted by holographic optical cells elements of a holographic optical element according to the first embodiment of this invention.

As shown in FIGS. 1 and 2, this LCD apparatus has a holographic optical element 11 to diffract parallel light 6 from a light source 1 at different diffraction angles for the respective the R, G and B wavelengths, so that the diffracted light components are condensed on the pixels of the associated colors of an LCD panel 3 to display a color image.

The light source 1 comprises a lamp 5 for generating white light including all the R, G and B wavelength light components, and a reflector 4 which has a parabolic surface. The lamp 5 is located at the focus point of the parabolic surface of the reflector 4. The light emitted from the lamp 5 in the light source 1 is reflected by the reflector 4 to become parallel light.

The LCD panel 3 comprises an LC cell 7, an incident-side polarization plate 8 and an outgoing-side polarization plate 9. The LC cell 7 has a liquid crystal sealed between a pair of transparent electrode substrates. The LC cell 7 has pixels corresponding to the R, G and B colors, arranged in a dot matrix form, and a black matrix 10 formed between the pixels. The distance between each pixel of the LC cell 7 and the holographic optical element 11 is 1.1 mm, and the transparent substrates of the LC cell 7 has a refractive index n of 1.52. The LC cell 7 has pixel pitches of 83 $\mu$m vertically and 88 $\mu$m horizontally, and has pixel sizes (sizes of the openings of the black matrix 10) of 43 $\mu$m vertically and 54 $\mu$m horizontally.

The holographic optical element 11 diffracts light of any wavelength with each diffraction grating at the diffraction angle which varies in accordance with the wavelength. The parallel light from the light source 1 hits the holographic optical element 11 at a predetermined angle (e.g., about 60°). The holographic optical element 11 diffracts this incident light to causes the light components of the respective wavelengths to enter the pixels of the associated R, G and B colors of the LC cell 7. This holographic optical element 11 has unit holographic optical elements 13 each consisting of a set of three holographic optical cells 12R, 12G and 12B for the R wavelength, G wavelength and B wavelength in association with the pixels of the respective colors of the LC cell 7. Each of the holographic optical cells 12R, 12G and 12B condenses light of a specific wavelength (lights of R, G and B wavelength light components respectively) in the R, G and B wavelength light components, diffracted at different diffraction angles, on those pixels of the associated color of the LC cell 7, and emits lights of the other wavelengths toward the respective pixels of the associated colors of the LC cell 7.

Figure 3A:
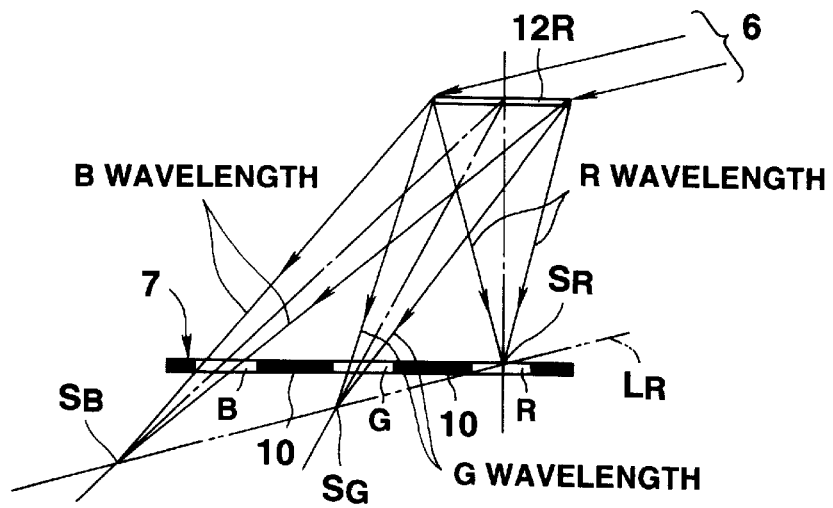
FIG. 3A is a principle diagram showing the diffraction state of a holographic optical cell 12R for the R wavelength in FIG. 2.

The condensation point $S_R$ for the R wavelength light of the holographic optical cell 12R, as shown in FIG. 3A, is so set as to come to the center of the pixel for R wavelength light (hereinafter called "R pixel") of the LC cell 7. The major rays of the R wavelength light diffracted by the holographic optical cell 12R hit the center of the R pixel of the LC cell 7 perpendicularly (in the direction normal to the LC cell 7). The condensation points $S_G$ and $S_B$ for the G and B wavelength lights of the holographic optical cell 12R are set on a straight line $L_R$, which is parallel to the incident light 6 to the holographic optical element 11 and passes the condensation point $S_R$ for the R wavelength light, at the positions corresponding to the pixels of G and B wavelength light (each hereinafter called "G pixel" and "B pixel") of the LC cell 7. The condensation points $S_G$ and $S_B$ for the G and B wavelength lights are positioned in the side of the LC cell 7 where light leaves (hereinafter called "outgoing-side"). The major rays of the G and B wavelength lights diffracted by the holographic optical cell 12R respectively hit the G and B pixels of the LC cell 7 at their specific angles.

Figure 4:
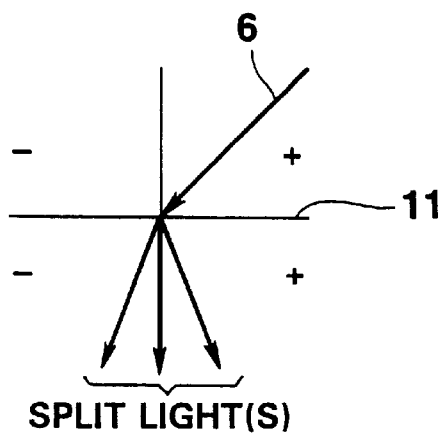
FIG. 4 is a diagram for explaining the positive and negative angles of the outgoing direction of light diffracted by the holographic optical cells in FIG. 2.

The holographic optical cell 12R has a diffraction grating uniformly formed along the aligning direction of the R, G and B pixels of the LC cell 7 at pitches of 716 nm. The major rays of the R wavelength light incident to the R pixel of the LC cell 7 has a wavelength of 620 nm. The major rays of the G wavelength light incident to the G pixel of the LC cell 7 has a wavelength of 533 nm. The major rays of the B wavelength light incident to the B pixel of the LC cell 7 has a wavelength of 448 nm. Given that the normal direction of the holographic optical cell 12R is 0°, an angle inclined to the left to this normal line in FIG. 4 is expressed by minus (−) and an angle inclined to the right to the normal line is expressed by plus (+), the major rays of the R wavelength light go out from the holographic optical cell 12R at 0°. The major rays of the G wavelength light go out from the holographic optical cell 12R at −4.6°. The major rays of the B wavelength light go out from the holographic optical cell 12R at −9.1°.

Figure 3B:
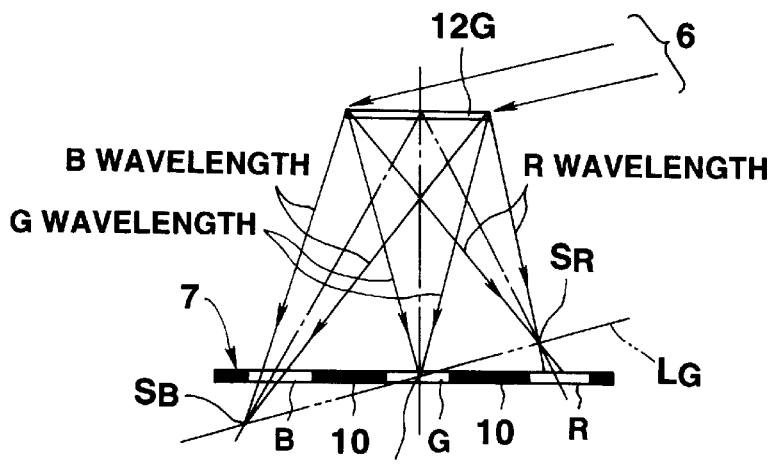
FIG. 3B is a principle diagram showing the diffraction state of a holographic optical cell 12G for the G wavelength in FIG. 2.

As shown in FIG. 3B, the condensation point $S_G$ for the G wavelength light of the holographic optical cell 12G is so set as to come to the center of the G pixel of the LC cell 7. The major rays of the G wavelength light diffracted by the holographic optical cell 12G hit the center of the G pixel of the LC cell 7 perpendicularly (in the normal direction of the LC cell 7). The condensation points $S_R$ and $S_B$ for the R and B wavelength lights of the holographic optical cell 12G are set on a straight line $L_G$, which is parallel to the incident light 6 to the holographic optical element 11 and passes the condensation point $S_G$ for the G wavelength light, at the positions corresponding to the R and B pixels of the LC cell 7. The condensation point $S_R$ for the R wavelength light is positioned in the side of the LC cell 7 where light enters (hereinafter called "incident-side"). The condensation point $S_B$ for the B wavelength light is positioned in the outgoing-side of the LC cell 7. The major rays of the R and B wavelength lights diffracted by the holographic optical cell 12G respectively hit the R and B pixels of the LC cell 7 at their specific angles.

The holographic optical cell 12G has a diffraction grating uniformly formed along the aligning direction of the R, G and B pixels of the LC cell 7 at pitches of 624 nm. The major rays of the R wavelength light incident to the R pixel of the LC cell 7 has a wavelength of 616 nm. The major rays of the G wavelength light incident to the G pixel of the LC cell 7 has a wavelength of 540 nm. The major rays of the B wavelength light incident to the B pixel of the LC cell 7 has a wavelength of 464 nm. Given that the normal direction of the holographic optical cell 12G is 0°, an angle inclined to the left to this normal line in FIG. 4 is expressed by minus (−) and an angle inclined to the right to the normal line is expressed by plus (+), the major rays of the G wavelength light go out from the holographic optical cell 12G at 0°. The major rays of the R wavelength light go out from the holographic optical cell 12G at +4.6°. The major rays of the B wavelength light go out from the holographic optical cell 12G at −4.6°.

Figure 3C:
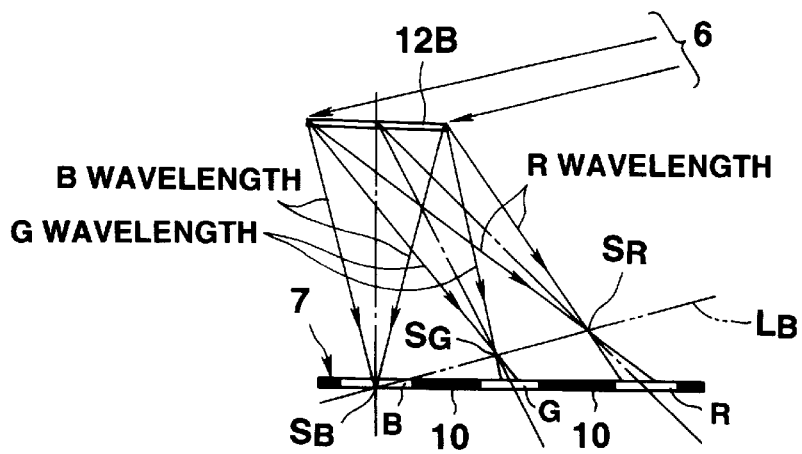
FIG. 3C is a principle diagram showing the diffraction state of a holographic optical cell 12B for the B wavelength in FIG. 2.

As shown in FIG. 3C, the condensation point $S_B$ for the B wavelength light of the holographic optical cell 12B is so set as to come to the center of the pixel for B of the LC cell 7. The major rays of the B wavelength light diffracted by the holographic optical cell 12B hit the center of the B pixel of the LC cell 7 perpendicularly (in the normal direction of the LC cell 7). The condensation points $S_R$ and $S_G$ for the R and G wavelength lights of the holographic optical cell 12B are set on a straight line $L_b$, which is parallel to the incident light 6 to the holographic optical element 11 and passes the condensation point $S_B$ for the B wavelength light, at the positions corresponding to the R and G pixels of the LC cell 7. The condensation points $S_R$ and $S_G$ for the R and G wavelength lights are positioned in the incident-side of the LC cell 7. The major rays of the R and G wavelength lights diffracted by the holographic optical cell 12B respectively hit the R and G pixels of the LC cell 7 at their specific angles.

The holographic optical cell 12B has a diffraction grating uniformly formed along the aligning direction of the R, G and B pixels of the LC cell 7 at pitches of 543 nm. The major rays of the R wavelength light incident to the R pixel of the LC cell 7 has a wavelength of 600 nm. The major rays of the G wavelength light incident to the G pixel of the LC cell 7 has a wavelength of 536 nm. The major rays of the B wavelength light incident to the B pixel of the LC cell 7 has a wavelength of 470 nm. Given that the normal direction of the holographic optical cell 12B is 0°, an angle inclined to the left to this normal line in FIG. 4 is expressed by minus (−) and an angle inclined to the right to the normal line is expressed by plus (+), the major rays of the B wavelength light go out from the holographic optical cell 12B at 0°. The major rays of the G wavelength light go out from the holographic optical cell 12B at +4.6°. The major rays of the R wavelength light go out from the holographic optical cell 12B at +9.1°.

In this LCD apparatus, the parallel light 6 from the light source 1 hits the holographic optical element 11 at an incident angle of about 60°. The holographic optical element 11 diffracts this incident light at different diffraction angles for the respective R, G and B wavelengths. At this time, the holographic optical cells 12R, 12G and 12B for the R wavelength, G wavelength and B wavelength, which constitute each unit holographic optical element 13, condense the respective lights of their specific wavelengths on the pixels of the associated colors in the LC cell 7. Each of the holographic optical cells 12R, 12G and 12B causes the lights of the other wavelengths than its specific wavelength to hit the other pixels of the associated colors in the LC cell 7.

This function will now be discussed more specifically for easier understanding. As shown in FIG. 3A, the light incident to the holographic optical cell 12R is diffracted by the holographic optical cell 12R at different diffraction angles for the respective R, G and B wavelengths. Of the individual diffracted wavelength lights, the R wavelength light is condensed to the R pixel of the LC cell 7. The G wavelength light is condensed toward the G pixel of the LC cell 7. The B wavelength light is condensed toward the B pixel of the LC cell 7. While the major rays of the G and B wavelength lights hit their respective G and B pixels at given angles at this time, the major rays of the R wavelength light perpendicularly hits the center of the R pixel or the condensation point $S_R$. The R wavelength light can therefore hit the R pixel efficiently.

The light incident to the holographic optical cell 12G, as shown in FIG. 3B, is diffracted by the holographic optical cell 12G at different diffraction angles for the respective R, G and B wavelengths. Of the individual diffracted wavelength lights, the G wavelength light is condensed to the G pixel of the LC cell 7. The R wavelength light is condensed toward the R pixel of the LC cell 7. The B wavelength light is condensed toward the B pixel of the LC cell 7. While the major rays of the R and B wavelength lights hit their respective R and B pixels at given angles at this time, the major rays of the G wavelength light perpendicularly hits the center of the G pixel or the condensation point $S_G$. The G wavelength light can therefore hit the G pixel efficiently.

As shown in FIG. 3C, the light incident to the holographic optical cell 12B is diffracted by the holographic optical cell 12B at different diffraction angles for the respective R, G and B wavelengths. Of the individual diffracted wavelength lights, the B wavelength light is condensed to the B pixel of the LC cell 7. The R wavelength light is condensed toward the R pixel of the LC cell 7. The G wavelength light is condensed toward the G pixel of the LC cell 7. While the major rays of the R and G wavelength lights hit their respective R and G pixels at given angles at this time, the major rays of the B wavelength light perpendicularly hits the center of the B pixel or the condensation point $S_B$. The B wavelength light can therefore hit the B pixel efficiently.

According to this LCD apparatus, as discussed above, the holographic optical cells 12R, 12G and 12B condense respective lights of specific wavelengths to the associated pixels of the LC cell 7 of the colors corresponding to those wavelengths. This design can average the hit efficiencies of the individual wavelength light components which respectively hit the R, G and b pixels of the LC cell. With this feature, the LCD apparatus can avoid the conventional problem of one of the individual wavelength light components (e.g., the G wavelength light) appears stronger to degrade the whiteness, and can thus display color images with higher whiteness.

The lights of the specific wavelengths of the holographic optical cells 12R, 12G and 12B have the respective condensation points $S_R$, $S_G$ and $S_B$ of the positioned in the centers of the associated pixels of the LC cell 7, and perpendicularly hit the associated pixels of the LC cell 7. In this LCD apparatus, therefore, the differences among the outgoing directions of the R, G and B wavelength lights become smaller to prevent irregular colors from appearing depending on the viewing direction of a user.

The holographic optical cells 12R, 12G and 12B can cause the lights of their specific wavelengths to hit the pixels of the associated colors in the LC cell 7. This LCD apparatus therefore has an excellent light use efficiency, which can provide bright color images.

In this embodiment, the three kinds of holographic optical cells 12R, 12G and 12B should not necessarily have the maximum diffraction efficiencies at the wavelengths for the respective colors (specific wavelengths), though such is desirable.

Although the foregoing description of this invention has been given of the LCD apparatus which allows a user to directly observe a color image displayed on the LCD panel 3, this invention is not limited to this particular type. For instance, this invention may be adapted to an LC projector which has a projection lens located in the outgoing-side of the LCD panel 3 to project a color image, displayed on the LCD panel 3, in a magnified form on a larger screen.

Although the holographic optical element 11 is used to split white light, generated by the light source 1, to red, green and blue wavelength lights in this embodiment, this invention is not limited to this particular case. Other optical elements than a holographic optical element can be used in the LCD apparatus of this invention as long as such an optical element, like the holographic optical element, uses a diffraction grating to split light.

Second Embodiment

The second embodiment of this invention will now be discussed with reference to FIGS. 1 and 5 to 7. To avoid the redundant description, like or same reference numerals are given to those components which are the same as the corresponding components of the first embodiment illustrated in the previously referred diagrams.

An LCD apparatus of the second embodiment has the same structure as that shown in FIG. 1, but differs from that of the first embodiment in that the holographic optical element 11 of the first embodiment has the unit holographic optical elements 13 each comprised of three holographic optical elements for the R, G and B wavelengths in association with each unit pixel consisting of three pixels of the LC cell 7, whereas a uniform unit holographic optical element 18 is provided in association with each unit pixel of the LC cell 7 in the second embodiment.

Figure 6:
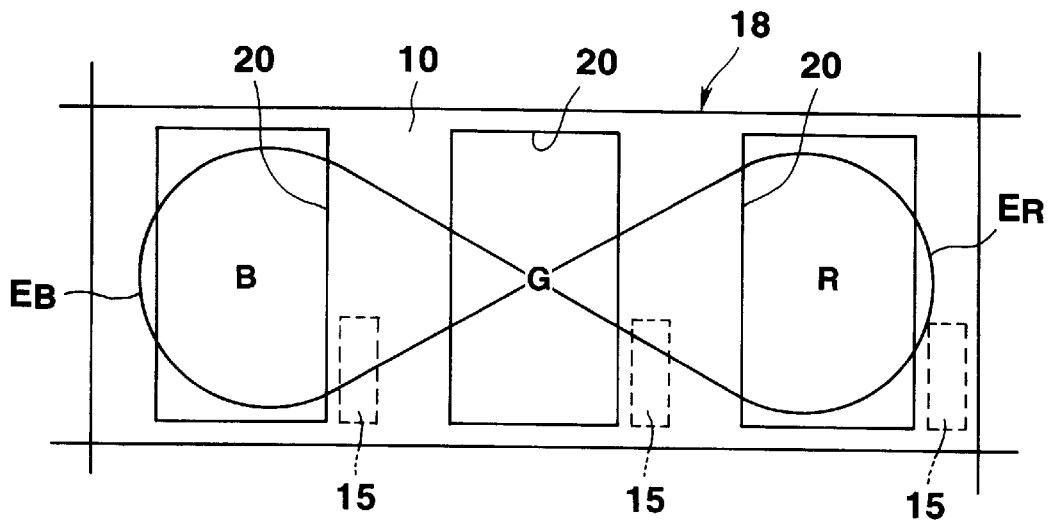
FIG. 6 is a diagram showing individual openings of unit pixels of an LC cell in FIG. 5 and where the lights from holographic optical element are condensed on the LC cell.

Of individual openings 20 of the black matrix 10 which correspond to the individual pixels of the LC cell 7, three openings 20 for a unit pixel are formed symmetrical with respect to the center of the opening 20 for G (the condensation point $S_G$ of the G wavelength) in the middle, as shown in FIG. 6. That is, the three openings 20 of a unit pixel have rectangular shapes which all have the same widths in the light splitting direction (the direction in which the light components split by the unit holographic optical element 18 are aligned on the LC cell 7) and all have the same dimensions. Individual TFTs 15 provided at the respective pixels of the LC cell 7 are located in those areas of the black matrix 10 which are to the right to the respective openings 20 in FIG. 6.

Figure 5:
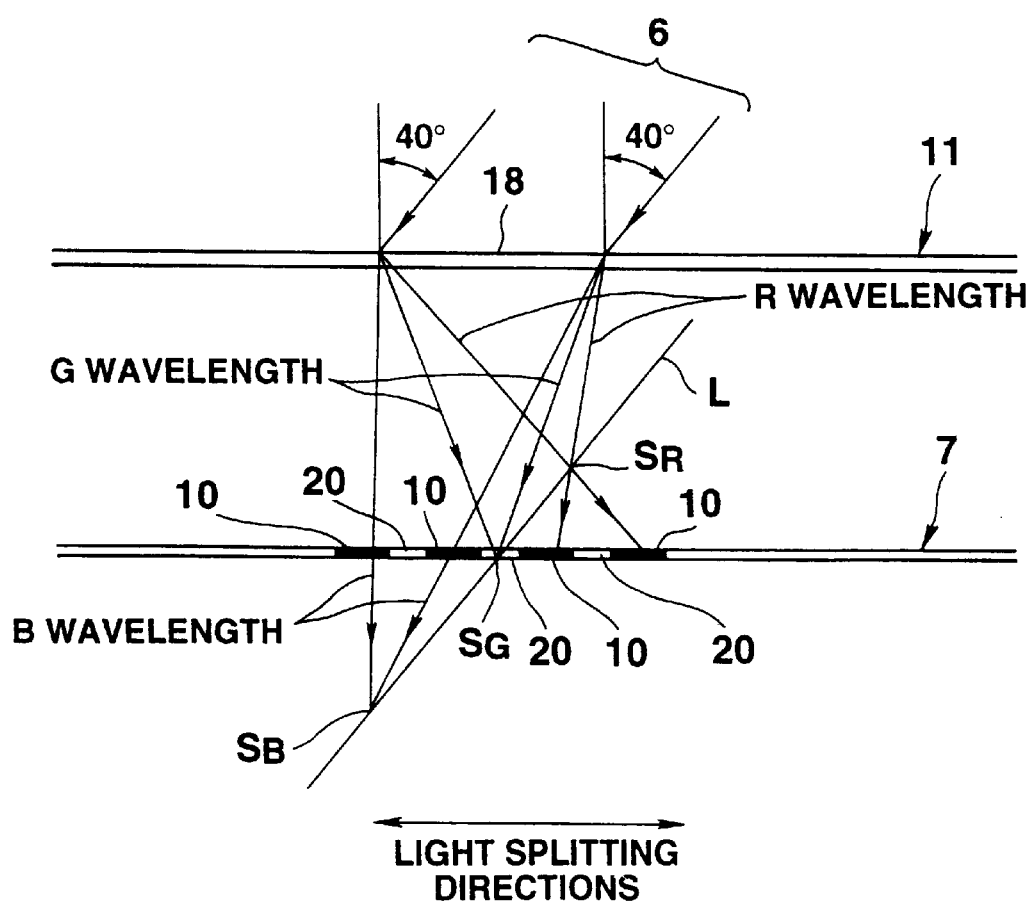
FIG. 5 is a diagram illustrating the diffraction state of a holographic optical element according to the second embodiment of this invention.

The unit holographic optical elements 18 corresponding to the unit pixels of the LC cell 7 are cyclically arranged in the holographic optical element 11. As shown in FIG. 5, each unit holographic optical element 18 diffracts the light, hit there at a predetermined angle (e.g., 40°), at different diffraction angles for the R, G and B wavelengths, so that the diffracted lights are condensed on the openings 20 of the pixels of the associated colors in the LC cell 7. That is, the condensation point $S_G$ of the G wavelength is positioned nearly in the center of the middle opening 20 for G, and the condensation points $S_R$ and $S_B$ for the R and B wavelengths are located at positions corresponding to the openings 20 for R and B and on the line L which is parallel to the incident light 6 and passes the condensation point $S_G$.

In this LCD apparatus, the three openings 20 of a unit pixel have rectangular shapes which all have the same widths in the light splitting direction and all have the same dimensions. Therefore, the lights diffracted by the unit holographic optical element 18 become symmetrical with respect to the center of the middle opening 20 for G in the three openings 20 of a unit pixel, i.e., with respect to the condensation point $S_G$ of the G wavelength light as the center. Accordingly, the individual R, G and B wavelength lights diffracted by the holographic optical element 11 substantially evenly hit the associated openings 20.

As shown in FIG. 6, the G wavelength light hits nearly the center of the opening 20 for G of the LC cell 7. The R and B wavelength lights respectively hit nearly circular areas $E_R$ and $E_B$ which respectively surround the openings 20 for R and B. In this LCD apparatus, the black matrix for covering the TFTs 15 does not partially cut in the openings 20, which are arranged symmetrical with respect to the center of the middle opening 20 for G. This permit the R and B wavelength lights to evenly hit the respective openings 20.

According to this LCD apparatus, as apparent from the above, the R, G and B wavelength lights substantially evenly hit the respective pixels, thus providing excellent color balance at each unit pixel. Since the unit pixels have the same color balance in this LCD apparatus, clear color images can be obtained.

Although the TFTs 15 are provided to the right to the openings 20 in this embodiment, they may be provided to the left to the openings 20 or may be provided to the right and left to the openings alternately at different lines. In either case, the TFTs 15 are positioned outside the openings 20, so that the same advantages as those of the second embodiment can be obtained.

Figure 7:
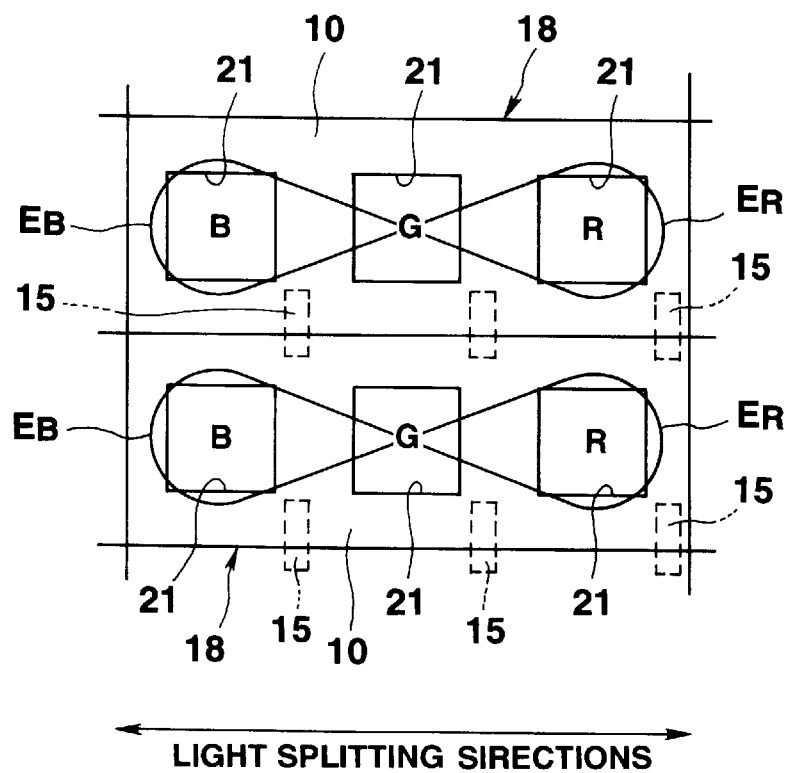
FIG. 7 is a diagram depicting a modification of what is shown in FIG. 6.

Although all the openings 20 are designed into rectangular shapes of the same dimensions and the TFTs 15 are arranged to the right thereto in this embodiment, this invention is not limited to this structure. As shown in FIG. 7, for example, the openings may all be formed into square shapes 21 of the same dimensions and the TFTs 15 may be arranged either below or above and to the right or left of the openings 20 in the light splitting direction. In this case, the widths of the unit holographic optical elements 18 in the direciton perpendicular to the light splitting direction should be set narrower than those of the second embodiment so that they become substantially equal to the pitch of the adjoining openings 21 in that direction (up and down direction).

Although the openings 20 are all formed rectangular or square of the same dimensions in this embodiment, such designs are not restrictive. The openings need not have rectangular or square shapes as long as they are formed symmetrical with respect to the center of the middle one of the three openings of a unit pixel.

Further, this invention is not limited to the LCD apparatus which allows a user to directly observe a color image displayed on the LCD panel 3. For example, this invention may be adapted to an LC projector which has a projection lens located in the outgoing-side of the LCD panel 3 to project a color image, displayed on the LCD panel 3, in a magnified form on a larger screen.

Furthermore, this invention is not limited to the case where the holographic optical element 11 is used to split white light, generated by the light source 1, to red, green and blue wavelength lights as discussed in the foregoing description of this embodiment. Other optical elements than a holographic optical element can be used in the LCD apparatus of this invention as long as such an optical element, like the holographic optical element, uses a diffraction grating to split light.

Third Embodiment

Figure 8:
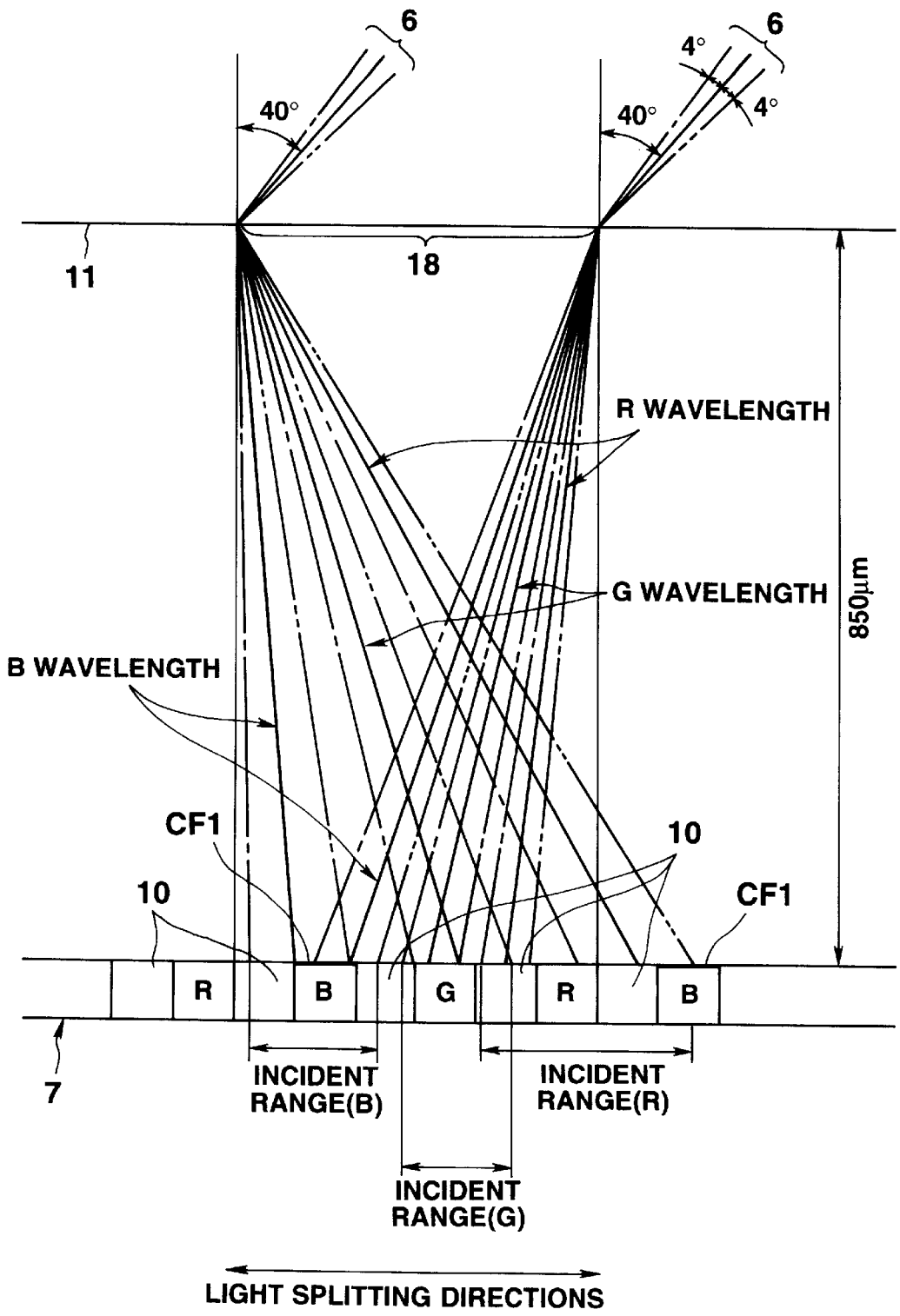
FIG. 8 is a diagram illustrating the optical path to the individual pixels of an LC cell from a holographic optical element according to the third embodiment of this invention.
Figure 9:
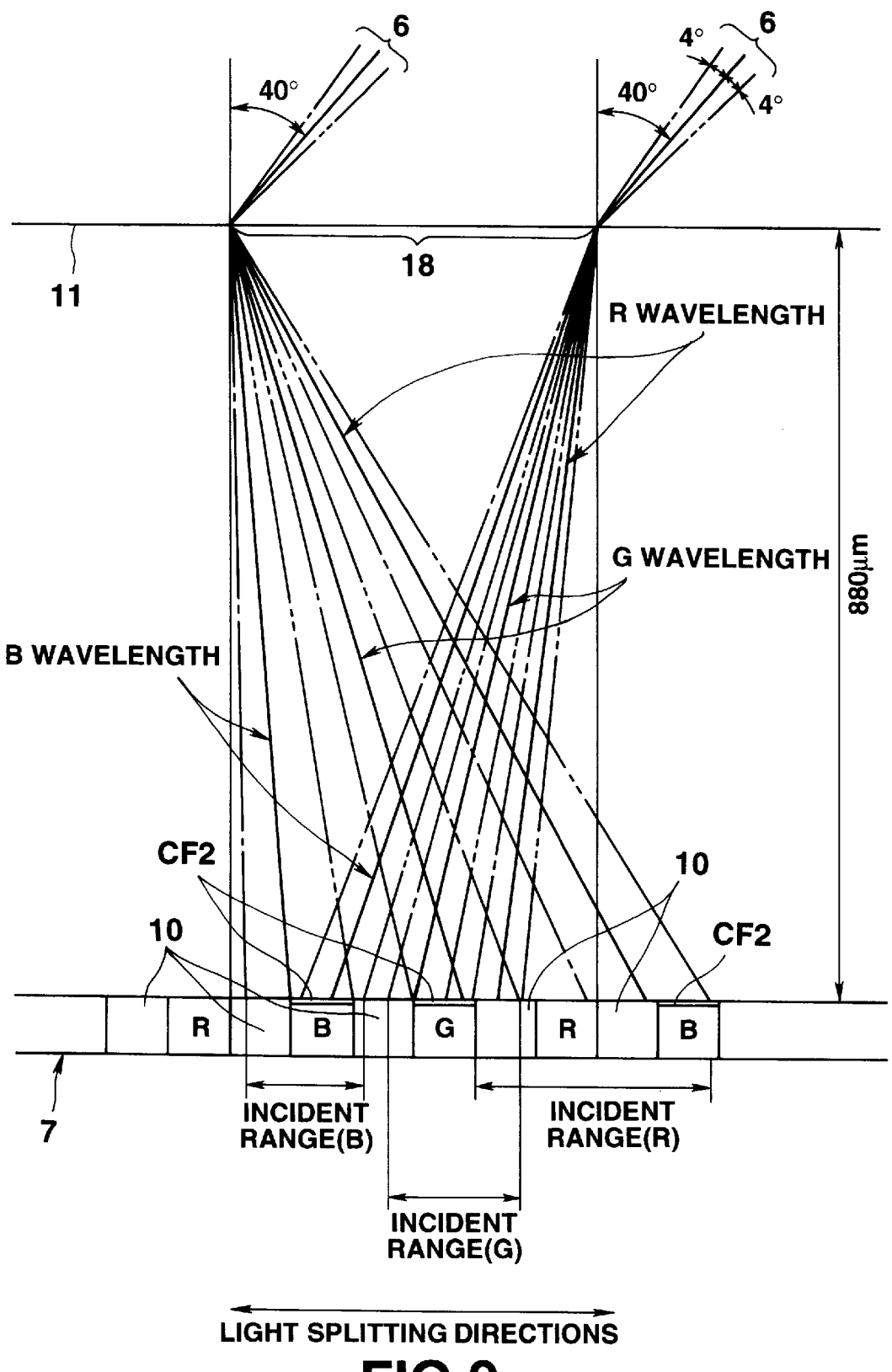
FIG. 9 is a diagram depicting a modification of what is shown in FIG. 8.

The third embodiment of this invention will now be discussed with reference to FIGS. 1, 8 and 9. To avoid the redundant description, like or same reference numerals are given to those components which are the same as the corresponding components of the first and second embodiments illustrated in the previously referred diagrams.

An LCD apparatus of the third embodiment has the same general structure as that shown in FIG. 1, but differs from that of the first embodiment in that the holographic optical element 11 has a uniform unit holographic optical element 18 provided in association with each unit pixel of the LC cell 7 in the third embodiment like that of the second embodiment.

The openings of the LC cell 7 have widths of 42 μm in the light splitting direction. The black matrix has a width of 46 μm in the light splitting direction. Color filters CF1 for absorbing the R wavelength light are provided in assocaition with the B pixels in the LC cell 7.

The holographic optical element 11 diffracts all the R, G and B wavelength lights with a single diffraction grating at different diffraction angles for the respective wavelengths. The parallel light 6 from the light source 1 hits the holographic optical element 11 at a predetermined angle (e.g., 40°). Each of the wavelength component lights diffracted by the holographic optical element 11 is condensed to the pixels of the associated colors in the LC cell 7. The holographic optical element 11 has unit holographic optical elements 18 cyclically arranged in association with the unit pixels of the LC cell 7.

Each unit holographic optical element 18 has a length of approximately 264 μm in the light splitting direction and the diffraction grating has a pitch d of 0.688 to 1.132 μm. Each unit holographic optical element 18 condenses the light components of the R wavelength (*1=0.64 μm), the G wavelength (*1=0.55 μm) and the B wavelength (*1=0.46 μm) to the pixels of the associated colors in the LC cell 7. To brighten the display images, the diffraction efficiency of the holographic optical element 11 for the G wavelength light is maximized.

The distance between the holographic optical element 11 and the light incident surfrace of each pixel of the LC cell 7 is set to approximately 850 μm. Accordingly, the holographic optical element 11 condenses the R wavelength light in the area of the R pixel (opening) and the area of the black matrix which surrounds this opening (both areas will hereinafter be called "R area"). The holographic optical element 11 condenses the G wavelength light in the area of the G pixel (opening) and the area of the black matrix which surrounds this opening (both areas will hereinafter be called "G area"). The holographic optical element 11 condenses the B wavelength light in the area of the B pixel (opening) and the area of the black matrix which surrounds this opening (both areas will hereinafter be called "B area").

In this LCD apparatus, however, the actual light from the light source 1 which hits the holographic optical element 11 at a predetermined angle of about 40° is not perfect parallel light, but hits the holographic optical element 11 within a margin of ±4°. As shown in FIG. 8, therefore, the G wavelength light diffracted by the holographic optical element 11 hits the G area, and the B wavelength light hits the B area. While the R wavelength light diffracted by the holographic optical element 11 mostly hits the R area, a part of that light also hits the adjoining B pixel. The R wavelength light which hits the B pixel is absorbed by the color filter CF1 provided in association with each B pixel. Consequently, only the B wavelength light of all the light components which hit the B pixel passes through the color filter CF1.

In this LCD apparatus, therefore, each pixel of the LC cell 7 passes the light component light whose wavelength corresponds to the color of that pixel in the incident light. This LCD apparatus can therefore provide clear color images with high color purities.

Since the color filters CF1 for B corresponding to the B pixels have only to be formed on the inner wall of the incident-side electrode substrate of the LC cell 7 or on the incident-side surfaces of the individual pixels in this LCD apparatus, the fabrication of the LC cell becomes simpler, which contributes to reducing the cost of the LCD apparatus. Conventionally, three color filters of R, G and B are typically used in an LC cell. Those color filters of R, G and B should be formed type by type. For example, the R filter material is provided on the entire inner wall of the incident-side electrode substrate and is etched by a photolithography technique to remove the unnecessary portion, thereby yielding the R filter corresponding to the R pixel. Likewise, the G and B color filters should be formed in order. This embodiment, however, requires the formation of only the color filter CF1 for B and can thus facilitate the fabrication of the LC cell 7.

Although the distance between the holographic optical element 11 and the light incident surfrace of each pixel of the LC cell 7 is set to approximately 850 μm, this distance is not in any way restrictive in this invention. As shown in FIG. 9, for example, the distance between the holographic optical element 11 and the light incident surfrace of each pixel of the LC cell 7 may be set to approximately 880 μm. In this case, even if the light from the light source 1 hits the holographic optical element 11 at an angle of 40°±4°, at least the G wavelength light is condensed in the G area. The LC cell 7 is provided with color filters CF2 for absorbing the R wavelength light in association with the individual G and B pixels.

In this LCD apparatus, the light from the light source 1 which hits the holographic optical element 11 at a predetermined angle of about 40° is not actually perfectly parallel light, but hits the holographic optical element 11 within a margin of ±4°. As shown in FIG. 9, therefore, the G wavelength light diffracted by the holographic optical element 11 hits the G area, and the B wavelength light hits the B area. While the R wavelength light diffracted by the holographic optical element 11 mostly hits the R area, a part of that light also hits the adjoining G and B pixels. The R wavelength light which hits the G and B pixels is absorbed by the color filters CF2 provided in association with the G and B pixels. Accordingly, only the G wavelength light of all the light components which hit each G pixel passes through the color filter CF2. Likewise, only the B wavelength light of all the light components which hit each B pixel passes through the color filter CF2.

In this LCD apparatus, therefore, each pixel of the LC cell 7 passes the light component in the incident light whose wavelength corresponds to the color of that pixel. This LCD apparatus can therefore provide clear color images with high color purities.

According to this LCD apparatus, not all the three types of color filters for R, G and B need be formed in the LC cell 7 but the formation of two types of color filters for G and B is sufficient. This feature makes the fabrication of the LC cell simpler than that by the conventional method, and can thus contribute to reducing the cost of the LCD apparatus.

Although the color filters CF1 or CF2 are formed on the inner wall of the incident-side electrode substrate of the LC cell 7 or on the incident-side surfaces of the individual pixels in the above-described embodiment, the color filters may be formed on the inner wall of the outgoing-side electrode substrate of the LC cell 7 or on the outgoing-side surfaces of the individual pixels.

Although the foregoing description of this embodiment has been given of the case where the incident-side polarization plate 8 is arranged in the outgoing-side of the holographic optical element 11, such an arrangement is in no way restrictive and the incident-side polarization plate 8 may be arranged in the incident-side of the holographic optical element 11. In this case, however, the polarization plate 8 should be arranged perpendicular to the optical axis of the light source 1.

Although the light source 1 is designed to emit parallel light in this embodiment, it may be designed to emit convergent light or divergent light. In this case, the light from the light source should be converted to parallel light by an optical element like Fresnel lens or a holographic optical element before it hits the holographic optical element 11.

Further, this invention is not limited to the LCD apparatus which allows a user to directly observe a color image displayed on the LCD panel 3. For example, this invention may be adapted to an LC projector which has a projection lens located in the outgoing-side of the LCD panel 3 to project a color image, displayed on the LCD panel 3, in a magnified form on a larger screen.

Moreover, this invention is not limited to the case where the holographic optical element 11 is used to split white light, generated by the light source 1, to red, green and blue wavelength lights as discussed in the foregoing description of this embodiment. Other optical elements than a holographic optical element can be used in the LCD apparatus of this invention as long as such an optical element, like the holographic optical element, uses a diffraction grating to split light.

What is claimed is:

1. A color liquid crystal display apparatus comprising:
    a light source for generating light including a plurality of color lights of different wavelengths;
    a holographic optical element for splitting the light generated by said light source into a plurality of color lights of different wavelengths to be transmitted; and
    a liquid crystal cell having a plurality of pixels to which any one of the plurality of color lights split by said holographic optical element may be made incident,
    wherein:
        said holographic optical element comprises unit holographic optical elements arranged in a periodic spatial relationship,
        each of said unit holographic optical elements comprises a set of three kinds of holographic optical cells which transmit mainly a red wavelength light, a green wavelength light and a blue wavelength light, respectively, toward associated pixels of said liquid crystal cell which are diffracted at different diffraction angles, and
        major rays of the red, green and blue wavelength lights hit center portions of associated pixels of said liquid crystal cell in a direction normal to the liquid crystal cell.

2. The liquid crystal display apparatus according to claim 1, wherein said three kinds of holographic optical cells of said holographic optical element mainly transmit light of a specific red wavelength, a specific green wavelength and a specific blue wavelength, respectively, which are diffracted at different diffraction angles, toward red, green and blue pixels of said liquid crystal cell, and transmit lights of other wavelengths toward respective pixels of said liquid crystal display device having associated colors.

3. The liquid crystal display apparatus according to claim 2, wherein said three kinds of holographic optical cells condense light of the specific red wavelength, the specific green wavelength and the specific blue wavelength, respectively, which are diffracted at the different diffraction angles, on the red, green and blue pixels of said liquid crystal cell, and transmit lights of other wavelengths toward the respective pixels of said liquid crystal display device having associated colors.

4. A color liquid crystal display apparatus comprising:
    a light source for generating light including a plurality of color lights of different wavelengths;
    an optical element comprising a diffraction grating for splitting said light generated by said light source into a plurality of color lights of different wavelengths to be transmitted; and
    a liquid crystal cell having a plurality of pixels to which any one of said plurality of color lights split by said optical element may be made incident,
    wherein:
        said optical element comprises unit optical elements arranged in a periodic spatial relationship,
        each of said unit optical elements comprises a set of plural kinds of optical cells which split mainly respective color lights of specific wavelengths and which transmit the split color lights toward associated pixels of said liquid crystal cell, which are diffracted at different diffraction angles, and
        major rays of the split color lights hit center portions of associated pixels of said liquid crystal cell in a direction normal to the liquid crystal cell.

5. The liquid crystal display apparatus according to claim 4, wherein said optical cells are holographic optical cells.

6. The liquid crystal display apparatus according to claim 5, wherein said plural kinds of holographic optical cells transmit major rays of light of a specific red wavelength, a specific green wavelength and a specific blue wavelength, respectively, which are diffracted at different diffraction angles, in a direction normal to red, green and blue pixels of said liquid crystal cell.

7. The liquid crystal display apparatus according to claim 5, wherein said plural kinds of holographic optical cells transmit major rays of light of different wavelengths, respectively, which are diffracted at different diffraction angles, in a direction normal to associated color pixels of said liquid crystal cell.

8. A color liquid crystal display apparatus comprising:

a light source for generating light including a plurality of color lights of different wavelengths;

a holographic optical element for splitting the light generated by said light source into a plurality of color lights of different wavelengths to be transmitted; and a liquid crystal cell having a plurality of pixels to which any one of the plurality of color lights split by said holographic optical element may be made incident, wherein:

said holographic optical element comprises unit holographic optical elements arranged in a periodic spatial relationship, each of said unit holographic optical elements comprises a set of three kinds of holographic optical cells which transmit major rays of light of a specific red wavelength, a specific green wavelength and a specific blue wavelength, respectively, which are diffracted at different diffraction angles, in a direction normal to red, green and blue pixels of said liquid crystal cell, and the major rays of light hit center portions of the associated pixels of said liquid crystal cell in a direction normal to the liquid crystal cell.

9. A color liquid crystal display apparatus comprising:

a light source for generating light including a plurality of color lights of different wavelengths;

an optical element comprising a diffraction grating for splitting said light generated by said light source into a plurality of color lights of different wavelengths to be transmitted; and a liquid crystal cell having a plurality of pixels to which any one of said plurality of color lights split by said optical elements may be made incident, wherein:

said optical element comprises unit optical elements arranged in a periodic spatial relationship, each of said unit optical elements comprises a set of plural kinds of optical cells which split mainly respective color lights of specific wavelengths and which transmit the split color lights, which are diffracted at different diffraction angles, in a direction normal to associated pixels of said liquid crystal cell, and the major rays of each of the split color lights hit center portions of the associated pixels of said liquid crystal cell in a direction normal to the liquid crystal cell.

* * * * *